(12) United States Patent
Diebenbusch et al.

(10) Patent No.: US 10,264,010 B2
(45) Date of Patent: *Apr. 16, 2019

(54) METHOD AND APPARATUS FOR TESTING A SECURITY OF COMMUNICATION OF A DEVICE UNDER TEST

(71) Applicant: Rohde & Schwarz GmbH & Co. KG, München (DE)

(72) Inventors: Stefan Diebenbusch, Fürstenfeldbruck (DE); Christian Hof, Fürstenfeldbruck (DE); Christoph Nufer, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 131 days.

This patent is subject to a terminal disclaimer.

(21) Appl. No.: 15/251,661

(22) Filed: Aug. 30, 2016

(65) Prior Publication Data
US 2018/0034845 A1 Feb. 1, 2018

(30) Foreign Application Priority Data
Jul. 29, 2016 (EP) .................................... 16182051

(51) Int. Cl.
*H04L 29/06* (2006.01)
*H04L 12/26* (2006.01)
*H04L 29/12* (2006.01)
*H04W 80/04* (2009.01)

(52) U.S. Cl.
CPC ........ *H04L 63/1433* (2013.01); *H04L 43/028* (2013.01); *H04L 61/2007* (2013.01); *H04L 63/0823* (2013.01); *H04L 63/1408* (2013.01); *H04L 63/20* (2013.01); *G06F 2221/2111* (2013.01); *H04W 80/04* (2013.01)

(58) Field of Classification Search
CPC ..................................................... H04L 63/1433
See application file for complete search history.

(56) References Cited

U.S. PATENT DOCUMENTS

| 8,352,725 B1 * | 1/2013 | O'Toole, Jr. ............ H04L 63/20 713/151 |
| 8,683,052 B1 * | 3/2014 | Brinskelle ........... H04L 63/0823 709/228 |
| 8,832,832 B1 | 9/2014 | Visbal |
| 2008/0311891 A1 | 12/2008 | Venkatachalam et al. |

(Continued)

OTHER PUBLICATIONS

Response to the European Search Report dated Dec. 9, 2016, from counterpart European Application No. 16186428.5, filed on Aug. 14, 2016, 26 pp.

(Continued)

*Primary Examiner* — Jason Chiang
(74) *Attorney, Agent, or Firm* — Shumaker & Sieffert, P.A.

(57) ABSTRACT

A test apparatus (1) for testing a security of communication of a device under test, DUT, (4), wherein the test apparatus (1) comprises an RF unit (2) having an RF interface adapted to receive from the device under test, DUT, (4) an RF signal carrying Internet Protocol, IP, data including at least one IP address; and an IP unit (3) adapted to analyze IP data carried in the received RF signal to check communication security of the device under test, DUT, (4) using at least one security criterion, SC-CEP, related to a communication endpoint, CEP, addressed by the IP address.

21 Claims, 8 Drawing Sheets

(56) References Cited

U.S. PATENT DOCUMENTS

| | | | |
|---|---|---|---|
| 2009/0007246 A1* | 1/2009 | Gutowski | H04L 63/20 726/6 |
| 2010/0100962 A1* | 4/2010 | Boren | H04L 63/1433 726/25 |
| 2012/0129517 A1* | 5/2012 | Fox | H04L 41/5025 455/425 |
| 2013/0097710 A1* | 4/2013 | Basavapatna | H04W 4/02 726/25 |
| 2013/0160119 A1* | 6/2013 | Sartin | G06F 21/552 726/23 |
| 2013/0160129 A1* | 6/2013 | Sartin | G06F 21/552 726/25 |
| 2014/0020078 A1 | 1/2014 | Canning et al. | |
| 2014/0137190 A1* | 5/2014 | Carey | H04L 63/1433 726/3 |
| 2015/0128205 A1* | 5/2015 | Mahaffey | H04L 63/20 726/1 |
| 2015/0186645 A1* | 7/2015 | Aziz | G06F 21/56 726/23 |
| 2016/0094573 A1* | 3/2016 | Sood | H04L 63/061 713/156 |
| 2016/0323295 A1* | 11/2016 | Joram | G06F 21/566 |
| 2016/0381074 A1* | 12/2016 | Ahmed Assem A. S. | H04L 63/20 726/1 |
| 2017/0163678 A1* | 6/2017 | Kern | H04L 63/1441 |
| 2017/0289190 A1* | 10/2017 | Kominar | H04L 63/1433 |
| 2017/0339172 A1* | 11/2017 | Mahadevia | H04L 63/1416 |
| 2018/0027020 A1* | 1/2018 | Pallas | H04L 63/20 |

OTHER PUBLICATIONS

Extended European Search Report for European Application No. 16186428.5 (dated Dec. 9, 2016).

* cited by examiner

METHOD AND APPARATUS FOR TESTING A SECURITY OF COMMUNICATION OF A DEVICE UNDER TEST

PRIORITY CLAIM

This application claims the benefit of European Patent Application No. 16182051.9, filed Jul. 29, 2016; the disclosure of which is incorporated herein by reference in its entirety.

FIELD OF THE INVENTION

The invention relates to a method and apparatus for testing a security of communication of a device under test, in particular an IP-based communication terminal.

TECHNICAL BACKGROUND

The growing functionality of communication terminals entails that testing of these terminals becomes increasingly important. The enhanced functionality of IP-based communication terminals generates demands to perform both RF measurements and IP measurements on such terminals. Further, in recent years, the aspect of IT security, also known as cybersecurity, has gained importance for all kind of information systems.

Against technical background, there is a need to provide a method and apparatus for testing a security of communication of a device under test formed by an IP-based communication terminal.

SUMMARY OF THE INVENTION

The invention provides according to the first aspect a test apparatus for testing a security of communication of a device under test wherein the test apparatus comprises:
an RF unit having an RF interface adapted to receive from the device under test an RF signal carrying Internet Protocol, IP, data including at least one IP address and
an IP unit adapted to analyse IP data carried in the received RF signal to check communication security of the device under test using at least one security criterion related to a communication endpoint addressed by the IP address.

In a possible embodiment of the test apparatus according to the first aspect of the present invention, the IP unit of the test apparatus is adapted to analyse IP data carried by the received RF signal to check the communication security of the device under test on the basis of at least one security criterion related to the communication endpoint addressed by the IP address,
wherein the at least one security criterion related to the communication endpoint comprises:
a reputation of the addressed communication endpoint,
a usage age of the IP address,
a geographical location of the addressed communication endpoint,
an owner of the addressed communication endpoint,
a type of the addressed communication endpoint,
an observed communication behaviour of the addressed communication endpoint, and/or
a certificate of the addressed communication endpoint issued by a trusted certificate authority.

In a further possible embodiment of the test apparatus according to the first aspect of the present invention, the security criterion related to the communication endpoint addressed by the IP address is read by said IP unit of said test apparatus from a communication endpoint look-up table stored in a memory.

In a possible embodiment, the memory storing the communication endpoint look-up table is a local memory integrated in the test apparatus.

In a possible alternative embodiment the memory storing the communication look-up table is a remote memory of a server of a data network to which the test apparatus is connected by means of a network interface of said test apparatus.

In a possible embodiment of the test apparatus according to the first aspect of the present invention, the IP address used for addressing the communication endpoint is a numerical IP address.

In a still further possible embodiment of the test apparatus according to the first aspect of the present invention, the IP address used to address the communication endpoint is a domain name being translated by a DNS server of a data network into a numerical IP address.

In a still further possible embodiment of the test apparatus according to the first aspect of the present invention, the IP unit comprises a server component adapted to initiate and/or terminate an IP connection between the device under test and a communication endpoint indicated by an IP address included in the IP data carried by the RF signal received by the RF interface of the RF unit of said test apparatus.

In a still further possible embodiment of the test apparatus according to the first aspect of the present invention, the IP unit is adapted to check the communication security of the device under test on the basis of
security criteria related to the communication endpoint addressed by the IP address,
security criteria related to the device under test and/or
security criteria related to the IP connection between the device under test and the communication endpoint addressed by the IP address.

In a possible embodiment of the test apparatus according to the first aspect of the present invention, the security criteria related to the device under test comprise protocols supported by the device under test and/or available cipher suites.

In a still further possible embodiment of the test apparatus according to the first aspect of the present invention, the security criteria related to the IP connection between the device under test and the communication endpoint addressed by the IP address comprise:
security criteria extracted from headers of data packets transported via the IP connection including a negotiated protocol type, a negotiated protocol version, a negotiated key exchange mechanism and/or a negotiated user cipher suites and/or security criteria extracted from data content of data packets transported via said IP connection including user names, passwords, a current position of the device under test, an IMEI and/or an IMSI.

In a still further possible embodiment of the test apparatus according to the first aspect of the present invention, the IP unit of the test apparatus is adapted to perform a communication security evaluation,
wherein a communication security provided by the device under test is evaluated on the basis of metrics applied to the different security criteria related to the communication endpoint addressed by the IP address, metrics applied to the different security criteria related to the device under test and/or metrics applied to the security criteria related to the IP connection between the device under test and the communication endpoint addressed by the IP address to calculate an overall communication security score value of the respective device under test.

In a still further possible embodiment of the test apparatus according to the first aspect of the present invention, the test apparatus is further adapted to influence an IP-based communication link between the device under test and a communication endpoint to analyse an impact on the operation behaviour of the device under test for checking the communication security of the respective device under test.

In a still further possible embodiment of the test apparatus according to the first aspect of the present invention, the test apparatus is adapted to influence the IP-based communication link between the device under test and the communication endpoint by modifying a data throughput of a wireless IP-based communication link between the device under test and the RF communication interface of the RF unit of said test apparatus and/or by modifying a data throughput of a wired IP communication link between the IP unit of said test apparatus and the communication endpoint.

In a still further possible embodiment of the test apparatus according to the first aspect of the present invention, the test apparatus is adapted to influence the IP-based communication link between the device under test and the communication endpoint by changing a Radio Access Network, RAN, technology of a wireless IP-based communication link between the device under test and the RF interface of the RF unit of said test apparatus.

In a still further possible embodiment of the test apparatus according to the first aspect of the present invention, the test apparatus is adapted to influence the IP-based communication link between the device under test and the communication endpoint by modifying an address type of an IP address of said device under test and/or an address type of the IP address used for addressing said communication endpoint and/or by modifying an IP connection type of an IP communication link between the IP unit of said test apparatus and the communication endpoint.

In a still further possible embodiment of the test apparatus according to the first aspect of the present invention, the test apparatus is adapted to influence the IP-based communication link between the device under test and the communication endpoint by providing a modified virtual location of said device under test detected by a position detection unit of the device under test.

In a still further possible embodiment of the test apparatus according to the first aspect of the present invention, the test apparatus is further adapted to influence the IP-based communication link between the device under test and the communication endpoint by providing a modified virtual network operator to said device under test.

In a still further possible embodiment of the test apparatus according to the first aspect of the present invention, the IP unit of the test apparatus is adapted to analyse the IP data carried by the received RF signal to check a connection behaviour of an application installed on the device under test.

In a still further possible embodiment of the test apparatus according to the first aspect of the present invention, the IP unit of the test apparatus is adapted to check the connection behaviour of the application installed on the device under test in response to a modified digital certificate.

In a still further possible embodiment of the test apparatus according to the first aspect of the present invention, the IP unit of said test apparatus comprises a port scan component configured to scan ports used by said device under test to check a current security status of said device under test.

In a still further possible embodiment of the test apparatus according to the first aspect of the present invention, the port scan component of said IP unit is adapted to analyse IP data carried by the RF signal received by the RF unit of said test apparatus to identify the ports used by the device under test.

In a still further possible embodiment of the test apparatus according to the first aspect of the present invention, the port scan component of the IP unit is adapted to evaluate whether the respective port used by the device under test is an open port, a closed port or an invisible port.

In a still further possible embodiment of the test apparatus according to the first aspect of the present invention, the test apparatus comprises an output interface to export communication security results related to the communication security of the device under test to an external processing unit.

In a further possible embodiment of the test apparatus according to the first aspect of the present invention, the test apparatus is adapted to test a device under test comprising a mobile device or a fixed terminal.

In a still further possible embodiment of the test apparatus according to the first aspect of the present invention, the test apparatus is a device connected via a wireless communication link to the device under test.

In a still further possible embodiment of the test apparatus according to the first aspect of the present invention, the test apparatus is a device plugged into the device under test.

In a still further possible embodiment of the test apparatus according to the first aspect of the present invention, the test apparatus is integrated in the device under test.

In a possible embodiment of the test apparatus according to the first aspect of the present invention, the test apparatus being integrated in the device under test is implemented on a trusted platform module.

In a still further possible embodiment of the test apparatus according to the first aspect of the present invention, the test apparatus integrated in said device under test is adapted to execute a test application for testing a security of a communication of the respective device under test.

In a still further possible embodiment of the test apparatus according to the first aspect of the present invention, the RF unit of said test apparatus is adapted to communicate with an RF unit of the device under test via a wireless IP-based communication link.

In a still further possible embodiment of the test apparatus according to the first aspect of the present invention, the RF unit of the device under test comprises a MIMO RF unit having several antennas, wherein said MIMO RF unit is controlled by the test apparatus integrated in said device under test.

The invention further provides according to a second aspect a method for testing a security of communication of a device under test comprising the features of claim 28.

The invention provides according to the second aspect a method for testing a security of communication of a device under test, DUT, comprising the steps of:

receiving from the device under test an RF signal carrying Internet Protocol, IP, data including at least one IP address; and analysing the IP data carried by the received RF signal to check a communication security of the device under test using at least one security criterion related to the communication endpoint addressed by the IP address and/or using at least one security criterion related to the device under test and/or using at least one security criterion related to the IP connection between the device under test and the communication endpoint addressed by the IP address.

In a possible embodiment of the method for testing a security of communication of a device under test according to the second aspect of the present invention, the IP-based communication link between the device under test and the communication endpoint addressed by the IP address is influenced during the testing to analyse an impact on the operation behaviour of the device under test.

In a further possible embodiment of the method for testing a security of communication of a device under test according to the second aspect of the present invention, the communication security of the device under test is evaluated on the basis of metrics applied to the different security criteria read from a stored look-up table to calculate an overall security score value of the device under test.

In a still possible embodiment of the method for testing a security of communication of a device under test according to the second aspect of the present invention, the IP data carried by the received RF signal is analysed to identify ports used by said device under test, wherein the identified ports are evaluated to determine whether the used ports comprise open, closed and/or invisible ports, wherein the communication security of the device under test is evaluated depending on the determined ports.

The invention further provides according to a third aspect a test apparatus for testing the security of communication of a device under test, wherein the test apparatus comprises an RF unit having an RF interface adapted to receive from said device under test an RF signal carrying Internet Protocol, IP, data and an IP unit adapted to extract IP data carried in the received RF signal to check security aspects of the IP-based communication links between the device under test and communication endpoints indicated in the extracted IP data.

In a possible embodiment of the test apparatus according to the third aspect of the present invention, each communication endpoint comprises an IP address, wherein the IP address comprises a numerical IP address or a domain name translated by a DNS server of a data network into a numerical IP address.

In a still further possible embodiment of the test apparatus according to the third aspect of the present invention, the IP unit of said test apparatus comprises a server component adapted to initiate and/or terminate an IP connection between the device under test and a communication endpoint indicated by the IP data via an IP-based communication link.

In a still further possible embodiment of the test apparatus according to the third aspect of the present invention, the security aspects checked by the IP unit of the test apparatus comprise first security aspects related to the device under test,
second security aspects related to the communication endpoint and
third security aspects related to the IP connection between the device under test and the communication endpoint.

In a further possible embodiment of the test apparatus according to the third aspect of the present invention, the IP unit of said test apparatus is adapted to analyse the IP data carried by the received RF signal to check a connection behaviour of an application installed on the device under test.

In a still further possible embodiment of the test apparatus according to the third aspect of the present invention, the IP unit of said test apparatus is adapted to check the connection behaviour of the application installed on the device under test in response to a modified digital certificate.

The invention further provides according to a fourth aspect a method for testing a security of communication of a device under test, comprising the steps of:

receiving from a device under test an RF signal carrying Internet Protocol, IP, data, extracting the IP data carried in the received RF signal, checking security aspects of the IP-based communication links between the device under test and communication endpoints indicated in the extracted IP data.

The invention further provides according to a fifth aspect a test apparatus for testing a security of a device under test, wherein the test apparatus comprises an RF unit having an RF interface adapted to receive from the device under test an RF signal carrying Internet Protocol, IP, data indicating ports used by said device under test and an IP unit comprising a port scan component configured to scan the indicated ports to check the current security status of the device under test.

In a possible embodiment of the test apparatus according to the fifth aspect of the present invention, the port scan component is configured to use IP addresses of the Internet Protocol, IP, data to identify ports of the device under test to be scanned by the port scan component.

In a possible embodiment of the test apparatus according to the fifth aspect of the present invention, the port scan component is adapted to evaluate an availability of the scan ports of the respective device under test.

In a still further possible embodiment of the test apparatus according to the fifth aspect of the present invention, the port scan component of the test apparatus is adapted to evaluate whether the scanned ports of the respective device under test comprise open ports, closed ports and/or invisible ports.

The invention further provides according to a sixth aspect a method for testing a security of a communication of a device under test, comprising the steps of:

receiving from the device under test an RF signal carrying Internet Protocol, IP, data indicating ports used by the device under test, scanning the indicated ports used by the device under test to check a current security status of the device under test.

In a possible embodiment, the ports used by the device under test during the test are included in IP addresses extracted from the Internet Protocol, IP, data carried by the RF signal.

BRIEF DESCRIPTION OF FIGURES

In the following, possible embodiments of the different aspects of the present invention are described in more detail with reference to the enclosed figures.

DETAILED DESCRIPTION OF EMBODIMENTS

Figure 1:
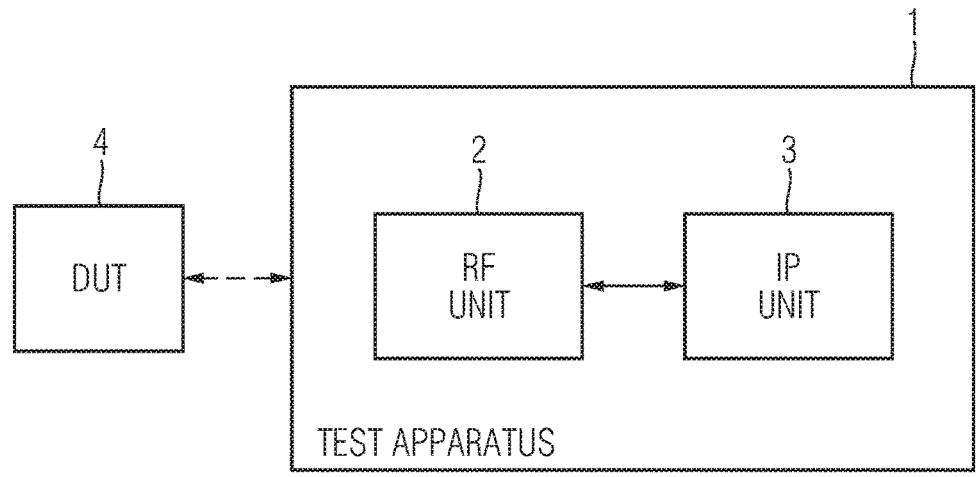
FIG. 1 shows a block diagram of a possible embodiment of a test apparatus according to the present invention.

As can be seen from the schematic block diagram illustrated in FIG. 1, the test apparatus 1 according to the present invention in the illustrated embodiment two main units, i.e. an RF unit 2 and an IP unit 3. The RF unit 2 of the test apparatus 1 comprises an RF interface adapted to receive from a device under test 4 an RF signal carrying Internet Protocol, IP, data including at least one IP address. The IP address can indicate a communication endpoint, CEP, which can be formed by an IP-based communication terminal. The device under test 4 can be formed by any IP-based communication terminal such as a smartphone, a tablet computer, a mobile computer, an internet of things, IoT, device or any other IP-based communication device that communicates via an IP-based wireless or wired link with another IP-based communication terminal. In the illustrated embodiment, the test apparatus 1 is connected via a wireless communication link to the device under test 4. In a possible embodiment, the device under test 4 can execute one or several application programs. These applications refer to user software which can be executed by a processing unit of the device under test 4. These applications can comprise applications which are available via a data network such as the internet. These applications require an activated internet IP communication to be established by the device under test 4. The device under test 4 comprises an integrated RF unit 2 which communicates which the RF interface of the RF unit 2 of the test apparatus 1 via the IP-based wireless communication link as illustrated in FIG. 1. The RF signals exchanged between the RF unit of the device under test 4 and the RF unit 2 of the test apparatus 1 carry Internet Protocol, IP, data which can include one or several IP addresses. The IP unit 3 of the test apparatus 1 is adapted to extract the IP data and to analyse the IP data carried in the received RF signal to check a communication security of the device under test 4 using at least one security criterion related to a communication endpoint addressed by an IP address included in the extracted Internet Protocol, IP, data. The IP address can comprise a numerical IP address and/or a domain name translated by a DNS server of a data network into a numerical IP address. In a possible embodiment, the test apparatus 1 is adapted to test a security of the communication of a smartphone forming an IP-based communication terminal 4 as a device under test, DUT. The device under test 4 can be a mobile device or a fixed terminal. In a possible embodiment, the device under test 4 can comprise an internet of thing device, such as a metering device installed in a household. For instance, the internet of thing device 4 can provide metering data to a power supply provider. In this scenario, the communication endpoint of the device under test 4 can be formed by the server of the power supply provider.

The IP unit 3 of the test apparatus 1 is adapted to analyse the extracted IP data carried in the received RF signal to check the communication security of the device under test 4 on the basis of different security criteria, SC. In a possible embodiment, the security criteria comprise security criteria, SC-CEP, related to the communication endpoint addressed by an IP address included in the extracted IP data. The at least one security criterion used by the IP unit 3 to check the communication security of the device under test 4 comprises in a possible embodiment a reputation of the communication endpoint addressed by the IP address.

In a possible embodiment, the at least one security criterion related to the communication endpoint used by the IP unit 3 to check the communication security of the device under test 4 can be read from a look-up table stored in a local or remote memory.

In a further possible embodiment, the security criterion related to the communication endpoint can also comprise a usage age of the respective IP address. With increasing usage age of the IP address, the communication security of the device under test 4 is estimated to be higher.

In a further possible implementation, the at least one security criterion related to the communication endpoint comprises a geographical location of the addressed communication endpoint, for instance a country code of the country where the communication endpoint is located. If, for instance, the geographical location where the communication endpoint is located is in a suspicious country the communication security of the device under test 4 is reduced. In a possible embodiment, the communication endpoint communicating with the device under test 4 via an IP-based communication link can be located at a fixed position remote from the device under test 4 and is connected via a data network such as the internet to a data network interface of the test apparatus 1. In a still further possible embodiment, the communication endpoint can also be a mobile device communicating with a backbone data network by means of an access point and an access network. The access network can be formed by a telephone network. Accordingly, in this embodiment, the geographical location of the communication endpoint can change having an impact on the estimated communication security of the device under test 4.

In a still further possible implementation, the at least one security criterion related to the communication endpoint used by the IP unit 3 used to check and/or determine the communication security of the device under test 4 comprises an owner of the addressed communication endpoint. Depending on the trustworthiness of the owner of the addressed communication endpoint, the communication security determined by the IP unit 3 can vary.

In a still further possible implementation of the test apparatus 1, the at least one security criterion related to the communication endpoint used by said IP unit 3 to evaluate the communication security of the device under test 4 can comprise a type of the addressed communication endpoint. For instance, the communication endpoint can be connected to the device under test 4 via a virtual private network, VPN. Further, the communication endpoint can be formed by a proxy server. A further possible type of the addressed communication endpoint can be a mode of an anonymity network like Tor. Accordingly, the type of the addressed communication endpoint has an impact on the observed communication security of the device under test 4.

In a still further possible embodiment, the at least one security criterion related to the communication endpoint used by the IP unit 3 to check the communication security of the device under test 4 comprises an observed communication behaviour of the addressed communication endpoint in the past. If the addressed communication endpoint has shown a suspicious behaviour in the past, the communication security of the device under test 4 communicating with the communication endpoint is deemed to be lower.

In a still further possible embodiment, the at least one security criterion related to the communication endpoint and being used by the IP unit 3 of the test apparatus 1 to evaluate the communication security of the device under test 4 comprises a digital certificate of the addressed communication endpoint which can be issued by a trusted certificate authority. The certificate of the addressed communication endpoint indicates a quality of the communication endpoint which can be used by the IP unit 3 to assess the communication security of the device under test 4 communicating with the respective communication endpoint.

In a possible embodiment, the security criteria related to the communication endpoint addressed by the IP address included in the IP data extracted from the received RF signal is read by the IP unit 3 from a communication endpoint look-up table LUT stored in a memory. In a possible embodiment, the memory is a local memory integrated in the test apparatus 1. In an alternative embodiment, the memory is a remote memory of a server of a data network to which the test apparatus 1 is connected by means of a network interface of the test apparatus 1.

In a possible embodiment, the IP unit 3 of the test apparatus 1 comprises at least one server component which is adapted to initiate and/or terminate an IP connection, IPC, i.e. an IP-based communication link between the device under test 4 and a communication endpoint indicated by an IP address included in the extracted IP data carried by the RF signal received by the RF interface of the RF unit 2 of the test apparatus 1. A server component can be integrated in the IP unit 3 of the test apparatus 1. In a possible embodiment, the server component can form a separate unit connected to the IP unit 3 of the test apparatus 1.

The IP unit 3 of the test apparatus 1 is adapted to check the communication security of the device under test 4 on the basis of security criteria SC-CEP related to the communication endpoint CEP addressed by the IP address. In a further possible embodiment, the IP unit 3 is also adapted to check the communication security of the device under test 4 on the basis of other security criteria comprising security criteria SC-DUT related to the device under test 4 itself and/or security criteria SC-IPC related to the IP connection between the device under test 4 and the communication endpoint CEP addressed by the IP address extracted from the IP data carried in the RF signal.

In a possible embodiment, the security criteria SC-DUT related to the device under test 4 can comprise protocols supported by the device under test 4 as well as available cipher suites. The security criteria can indicate a supported protocol and version support, e.g. TLS version 1.2. Further, the security criteria related to the device under test 4 can indicate supported protocol details such as signature algorithms and used elliptic curves.

In a still further possible embodiment, the security criteria used by the IP unit 3 comprises security criteria SC-IPC related to the IP connection between the device under test 4 and the communication endpoint addressed by the IP address. These security criteria can comprise security criteria extracted from headers of data packets transported via the IP connection including a negotiated protocol type, a negotiated protocol version, a negotiated key exchange mechanism as well as negotiated used cipher suites. The security criteria related to the IP connection IPC between the device under test 4 and the communication endpoint can also be extracted in a possible embodiment from the data contents of the exchanged data packets transported via the IP connection. The security criteria extracted from the data content can be security-related such as user names or passwords but also privacy-related comprising for instance a current position of the device under test 4, an IMEI or an IMSI.

In a possible embodiment, the IP unit 3 of the test apparatus 1 is configured to perform a communication security evaluation for the device under test 4. During the communication security evaluation, the communication security provided by the device under test 4 is evaluated on the basis of metrics applied to the different security criteria. In a possible embodiment, the communication security provided by the device under test 4 is evaluated by the IP unit 3 of the test apparatus 1 on the basis of metrics applied to the different security criteria SC-CEP related to the communication endpoint addressed by the IP address, metrics applied to the different security criteria SC-DUT related to the device under test 4 itself and/or on the basis of metrics applied to the security criteria SC-IPC related to the IP connection between the device under test 4 and the communication endpoint addressed by the IP address. The communication security evaluation performed by the IP unit 3 based on the metrics applied to the different security criteria is performed in a possible embodiment to calculate an overall communication security score value CSSV of the device under test 4. Depending on the overall communication security score value, the test apparatus 1 can indicate the communication security of the device under test 4 and can output the evaluated communication security via a user interface and/or via a data interface to an external processing unit for further processing.

Depending on the overall communication security score value CSSV of the device under test 4, different measures can be taken. In a possible embodiment, the calculated communication security score value CSSV of the device under test 4 is communicated to the user of the device under test 4. For instance, the determined security of communication of the device under test 4 can be displayed to the user of the device under test 4 and the user can decide for himself whether the estimated security of communication is sufficient for his purposes. In a still further possible implementation, the calculated communication security score value CSSV can have an impact on the operation of the device under test 4. For example, if the communication security score value CSSV falls beneath a threshold some or all applications of the device under test 4 can be partially or completely deactivated. This can be done by the user of the device under test 4 and/or directly by the test apparatus 1.

In a still further possible implementation, the user can be informed that the addressed communication endpoint CEP does not provide sufficient communication security and that the user and/or the application may communicate with another communication endpoint providing sufficient communication security. As soon as the IP address of the communication endpoint CEP has been changed by the application and/or by the user of the device under test 4, the test apparatus 1 may reiterate the testing of the security of the communication to check whether the new communication endpoint addressed by the changed IP address provides now sufficient communication security.

In a still further possible implementation, the test apparatus 1 can make proposals of alternative communication endpoints providing sufficient communication security if the initial communication endpoint leads to a calculated communication security score value CSSV being beneath a configurable threshold value. In a possible implementation, a list of alternative communication endpoints can be loaded by the test apparatus 1 from a database connected to the test apparatus 1 via a data network.

In a still further implementation, the IP unit 3 of the test apparatus 1 can inform an application executed on the device under test 4 and/or the user of the device under test 4 about a suspicious communication endpoint CEP addressed by an IP address and request the application and/or user to use another communication endpoint CEP for the respective application. In a further possible implementation, the test apparatus 1 can monitor the reaction of the application and/or user to the requested change of the communication endpoint. In case that the application and/or the user insist on the communication endpoint providing not a sufficient security communication, the test apparatus 1 can in a possible implementation disable the respective application and/or the complete device under test 4 after a predetermined number of attempts performed by the device under test 4 to establish the communication link with the suspicious communication endpoint.

In a possible embodiment, the test apparatus 1 can apply different sets of security criteria for different test sequences. For example, in a first test sequence, only security criteria SC-CEP related to the communication endpoint are used to calculate the overall security score value of the device under test. In a further second test sequence, only security criteria related to the device under test 4 are used to calculate a communication security score value CSSV of the device under test 4. Further, in a third test sequence, only security criteria SC-IPC related to the IP connection between the device under test 4 and the communication endpoint are used to calculate the communication security score value CSSV of the device under test 4. Accordingly, different sets of security criteria can be selected by the IP unit 3 for different test purposes and different associated communication security score values CSSVs can be calculated and output or reported by the test apparatus 1.

In a still further possible embodiment, the test apparatus 1 is further adapted to influence an IP-based communication link between the device under test 4 and a communication endpoint to analyse an impact on the operation behaviour of the device under test 4 for checking the communication security of the respective device under test 4. In a possible embodiment, the test apparatus 1 is configured to influence the IP-based communication link between the device under test 4 and the communication endpoint by modifying a data throughput of a wireless IP-based communication link between the device under test 4 and the RF communication interface of the RF unit 2 of the test apparatus 1. In a still further possible embodiment, the test apparatus 1 is further adapted to influence the IP-based communication link between the device under test 4 and the communication endpoint by modifying a data throughput of a wired IP communication link between the IP unit 3 of the test apparatus 1 and the respective communication endpoint. For instance, the device under test 4 can be tested for a high data throughput versus a low data throughput. Accordingly, the test apparatus 1 can perform in this embodiment comparative measurements. Malware on an IP-based communication terminal or device under test 4 can behave differently depending on the environment. In order to detect and analyse such different and/or changing behaviour, the test apparatus 1 can perform comparative measurements on the device under test 4. This can be performed to detect malicious applications or malware installed on the device under test 4. Malicious applications can comprise viruses, Trojan horses, backdoors, etc. An example for an unwanted behaviour includes for instance a transmission of confidential data via IP connections that are initiated from malware installed on the device under test 4. In a possible embodiment, the test apparatus 1 is adapted to influence the IP-based communication link between the device under test 4 and the communication endpoint by changing a radio access network, RAN, technology of a wireless IP-based communication link between the device under test 4 and the RF interface of the RF unit 2 of the test apparatus 1. Further, the test apparatus 1 can be adapted to influence the IP-based communication link between the device under test 4 and the communication endpoint by modifying an address type of an IP address of the device under test 4. Further, the test apparatus 1 can be adapted in a further embodiment to modify an address type of the IP address used for addressing the communication endpoint and/or to modify an IP connection type of an IP communication link between the IP unit 3 of the test apparatus 1 and the respective communication endpoint. Accordingly, the comparative measurements performed by the test apparatus 1 can comprise in this embodiment a measurement between different RAN technologies such as LTE versus WiFi, between different IP-addressed types such as private IP addresses versus public IP addresses or known company endpoint addresses versus unknown company endpoint addresses. Further, the comparative measurements can be performed to detect a different behaviour between open and tunnelled connections (VPN). Further, the comparative measurements can be performed by the test apparatus 1 to detect a different behaviour of the device under test 4 for open and anonymized connections such as "Tor".

In a still further possible embodiment, the test apparatus 1 is adapted to influence the IP-based communication link between the device under test 4 and the communication endpoint by providing a modified virtual location of the device under test 4 detected by a position detection unit of the device under test 4. In this embodiment, the test apparatus 1 can simulate different locations to the device under test 4. The position detection unit 4 of the device under test such as a GPS unit detects the simulated location so that the applications executed by the device under test 4 are provided with position data corresponding to the locations simulated by the test apparatus 1. In a possible implementation, the test apparatus 1 comprises a signal generator generating a signal transmitted by the test apparatus 1 to a position detection unit of the device under test 4 carrying the simulated location data. In a still further possible embodiment, the test apparatus 1 is adapted to influence the IP-based communication link between the device under test 4 and the communication endpoint by providing a modified virtual network operator to the device under test 4. In this embodiment, the test apparatus 1 simulates networks of different operators, for instance different mobile operators in different countries. The IP unit 3 of the test apparatus 1 is configured to monitor and evaluate the impact on the communication behaviour of the device under test 4 by the simulated location and/or simulated network operator. In a possible embodiment, the IP unit 3 is adapted to analyse the IP data carried by the received RF signal to check a connection behaviour of an application installed on the device under test 4 and running on an execution engine of the device under test 4 in response to changed environmental parameters including a simulated location, a simulated network operator or other simulated environmental influences such as physical parameters including temperature, pressure, etc.

When performing the comparative measurements the tests performed by the test apparatus 1 are active tests, i.e. the test apparatus 1 can be designed to activate actively an IP-based communication terminal under test in order to probe the availability and accessibility of different IP connections and/or influencing the communication behaviour actively, for instance by simulated locations and/or simulated network operators. In a further possible embodiment, the IP unit 3 of the test apparatus 1 is configured to check the connection behaviour of an application installed on the device under test 4 in response to a modified digital certificate.

It is also possible that the test apparatus 1 operates passively. In this embodiment, the test apparatus 1 performs the tests on the device under test 4 passively, i.e. in particular without modifying the contents and data. In this embodiment, the test apparatus 1 acts as an observer of an IP-based communication link between the device under test 4 and the communication endpoints.

In a still further possible embodiment, the test apparatus 1 can be operated in different operation modes comprising in a possible implementation an active operation mode and a passive operation mode. In the passive operation mode, the test apparatus 1 does not influence the IP-based communication link between the device under test 4 and the communication endpoint. In contrast, in the active operation mode, the test apparatus 1 is configured to influence the IP-based communication link between the device under test 4 and the communication endpoint.

In a further possible embodiment of the test apparatus 1 according to the present invention, the IP unit 3 of the test apparatus 1 comprises an integrated server component adapted to initiate and/or terminate an IP connection between the device under test 4 and a communication endpoint indicated by an IP address included in IP data carried by the RF signal received by the RF interface of the RF unit 2 of the test apparatus 1. In this embodiment, the server component provides a connection endpoint for cryptographic protocols such as SSL, TLS. This can be used to test the behaviour of applications implemented on the device under test 4. Examples include using a modified (fake) certificate in order to analyse and/or compare the connection behaviour of an application that is installed on the IP-based communication device under test 4. In a further possible embodiment of the test apparatus 1 according to the present invention, the IP unit 3 comprises a port scan component which is adapted to scan ports used by the device under test 4 to check a current security status of the device under test 4. In a possible implementation, the port scan component of the IP unit 3 is adapted to analyse the IP data carried by the RF signal received by the RF unit 2 of the test apparatus 1 to identify different types of ports used by the device under test 4 during the IP-based communication. In a possible embodiment, the port scan component of the IP unit 3 is adapted to evaluate whether the respective port used by the device under test 4 is an open port, a closed port or an invisible port.

In a further possible embodiment, the test apparatus 1 comprises an output interface to export the communication security results including the communication security score values CSSVs related to the communication security of the device under test 4 to an external processing unit for further evaluation. In the embodiment illustrated in FIG. 1, the test apparatus 1 is formed by a separate device connected via a wireless communication link to the device under test 4. In an alternative embodiment, the test apparatus can be formed by a device plugged into the device under test 4. In a still further alternative embodiment, the test apparatus 1 can also be integrated in the device under test 4. In this implementation, the test apparatus 1 is preferably integrated in the device under test 4 and implemented on a trusted platform module TPM of the device under test 4. In the embodiment where the test apparatus 1 is integrated in the device under test 4, it can be adapted in a possible implementation to execute a test application for testing a security of the communication of the respective device under test 4. In a possible embodiment, the RF unit 2 of the device under test 4 can comprise a MIMO RF unit having several antennas for transmitting and receiving RF signals. In a possible implementation, the MIMO RF unit of the device under test 4 can be controlled by the test apparatus 1 integrated in said device under test 4 and implemented on a trusted platform module TPM of the device under test 4.

The test apparatus 1 can comprise a processing unit adapted to perform a testing program for testing the device under test 4. The test program can implement a method for testing a security of communication of the device under test 4. In a possible embodiment of the method for testing a security of communication of the device under test 4, the method comprises two main steps. In a first step, an RF signal carrying Internet Protocol, IP, data is received from the device under test 4 including at least one IP address. In a further step, the IP data carried by the received RF signal is extracted and analysed automatically to check a communication security of the device under test 4 using different security criteria. The security criteria can be read from a look-up table LUT stored in a memory. The security criteria can comprise at least one security criterion SC-CEP related to a communication endpoint addressed by the IP address and/or at least one security criterion SC-DUT related to the device under test 4 and/or at least one security criterion SC-IPC related to the IP connection between the device under test 4 and the communication endpoint addressed by the IP address. In a possible embodiment of the implemented method, the IP-based communication link between the device under test 4 and the communication endpoint addressed by the IP address is influenced during the testing to analyse an impact on the operation behaviour of the device under test 4. In a possible embodiment, the communication security of the device under test 4 is evaluated on the basis of metrics applied to the different security criteria read from the stored look-up table LUT to calculate an overall communication security score value CSSV of the device under test 4. In a further possible embodiment of the computer-implemented method for testing the security of the communication of a device under test 4, the IP data carried by the received RF signal is analysed first to identify ports used by the device under test 4 and the identified ports are then evaluated to determine whether the used ports comprise ports of different port types including open, closed and/or invisible ports. Finally, the communication security of the device under test is evaluated depending on the determined port types used by the device under test 4 during communication with the communication endpoint.

Figure 2:
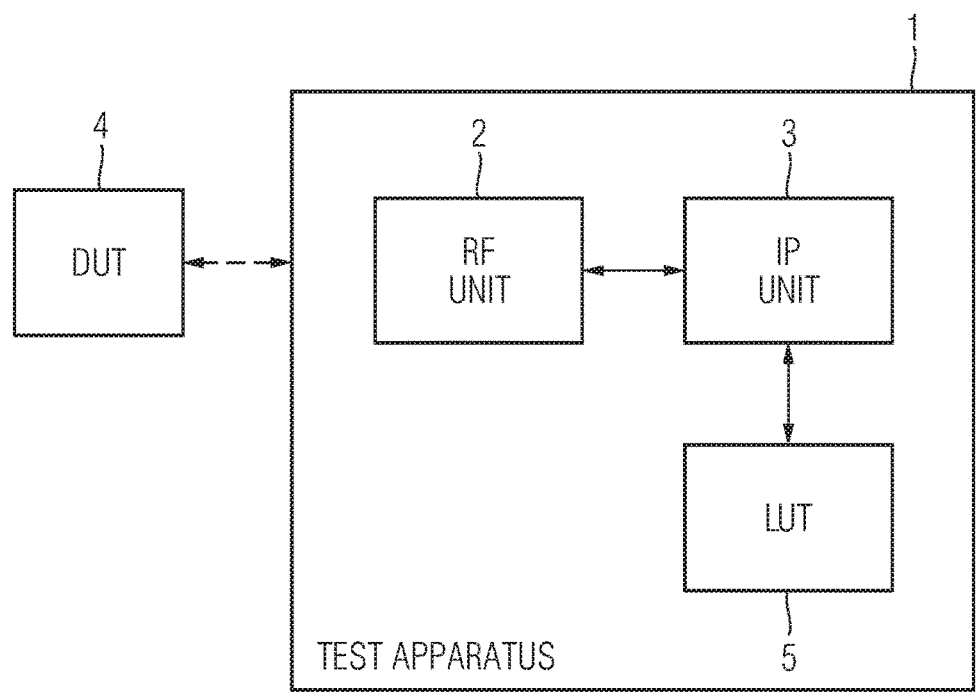
FIG. 2 shows a block diagram of a further possible exemplary embodiment of a test apparatus according to the present invention.

FIG. 2 illustrates a possible exemplary embodiment of the test apparatus 1 according to the first aspect of the present invention. In the illustrated embodiment of FIG. 2, the test apparatus 1 comprises a local memory 5 storing a look-up table LUT. The IP unit 3 of the test apparatus 1 has access to this local look-up table LUT stored in the memory 5 of the test apparatus 1. In the illustrated embodiment, the security criteria used by the IP unit 3 to assess the communication security of the device under test 4 are stored in a local memory 5. In a possible implementation, the memory 5 stores security criteria SC-CEP related to the communication endpoint addressed by an IP address extracted from the IP data carried in the received RF signal, security criteria SC-DUT related to the device under test 4 and/or security criteria SC-IPC related to the IP connection between the device under test 4 and the communication endpoint addressed by the IP address. The memory 5 is a local memory which can be integrated in the test apparatus 1. In a preferred embodiment, the security criteria and other data stored in the memory 5 are configurable via a configuration interface of the test apparatus 1. In a possible embodiment, the local memory can also be a data carrier inserted into the test apparatus 1 and read by a data reading unit of the test apparatus 1.

Figure 3:
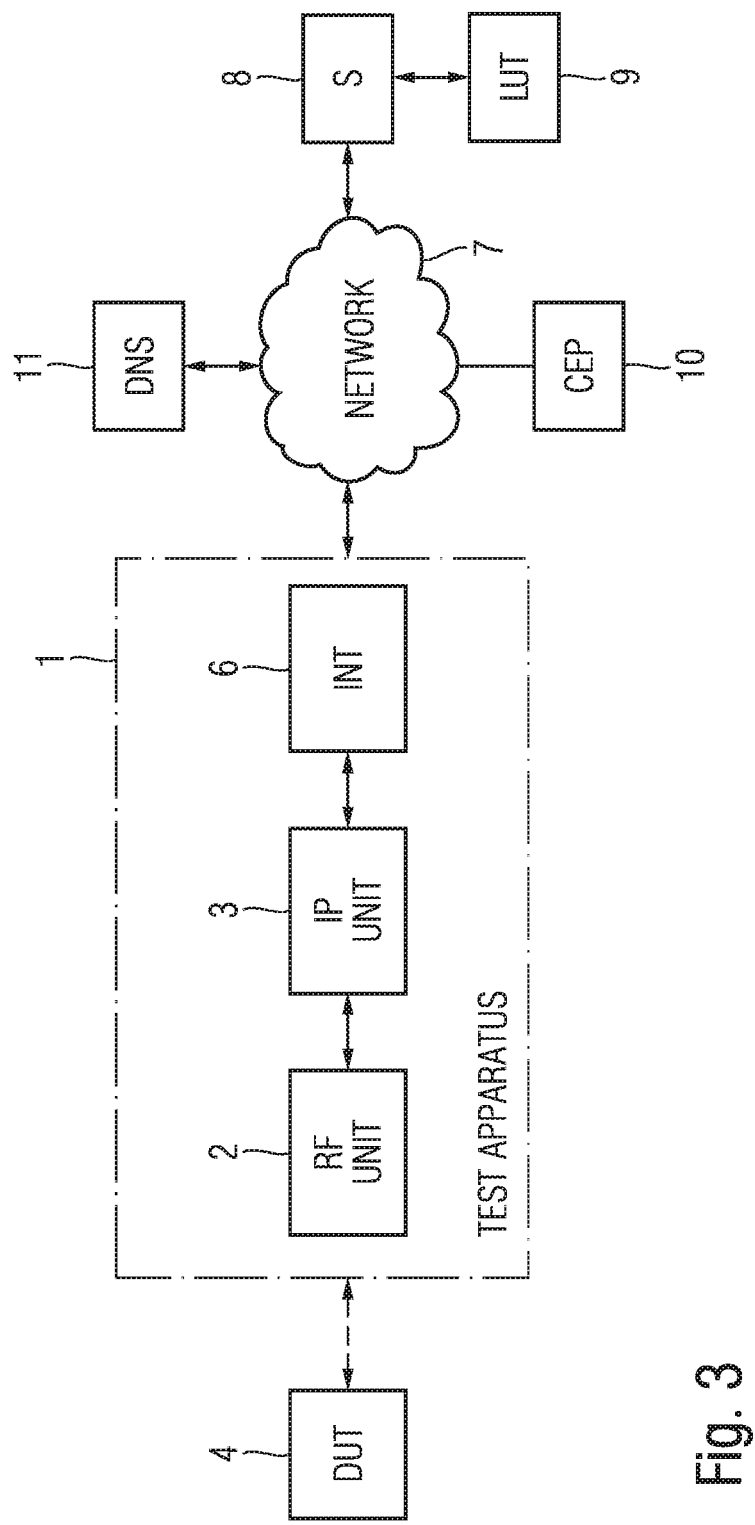
FIG. 3 shows a further block diagram for illustrating a possible exemplary embodiment of a test apparatus according to the present invention.

FIG. 3 shows a further possible exemplary embodiment of a test apparatus 1 according to the first aspect of the present invention. In the illustrated embodiment, the test apparatus 1 comprises a data network interface 6 connecting the test apparatus 1 to a data network 7 which can be formed by the internet. In the illustrated schematic diagram, a remote server 8 is also connected to the network 7 having access to a database or memory 9 storing a look-up table LUT. The look-up table LUT stored in the remote memory 9 can also comprise different security criteria used by the IP unit 3 for checking the communication security of the device under test 4 when communicating with a communication endpoint. The security criteria stored in the look-up table LUT or database 9 of the server 8 can comprise security criteria SC-CEP related to the communication endpoint addressed by an IP address extracted from IP data carried by the received RF signal, security criteria SC-DUT related to the device under test 4 and/or security criteria SC-IPC related to the IP connection between the device under test 4 and the communication endpoint addressed by the IP address. In the schematic diagram illustrated in FIG. 3, the communication endpoint CEP of the device under test 4 is another IP-based terminal 10 connected also to the data network 7. Further, as illustrated in FIG. 3, the network 7 can comprise at least one DNS server 11 adapted to translate a domain name into a numerical IP address. In a possible embodiment, the IP address used by the device under test 4 can comprise a numerical IP address. In an alternative embodiment, the IP address can comprise a domain name translated by the DNS server 11 into a numerical IP address.

Figure 4:
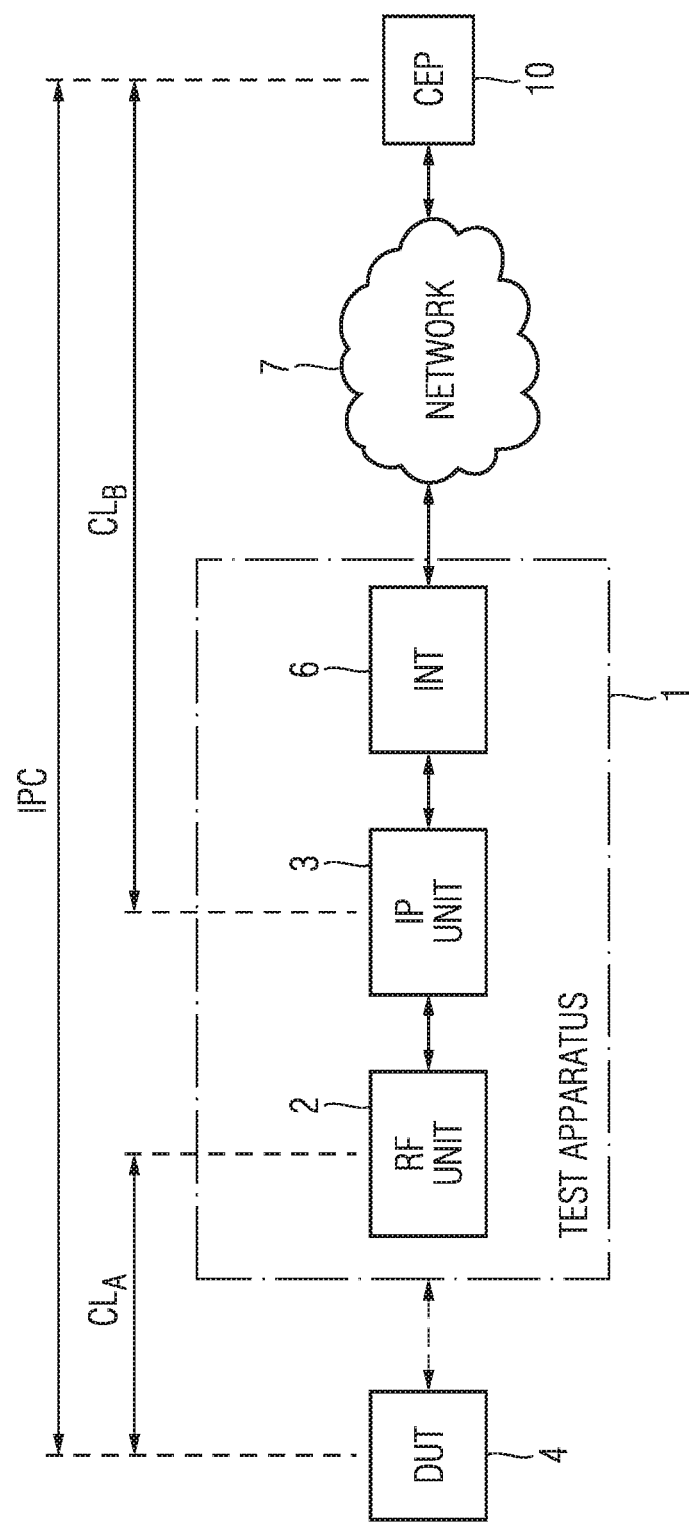
FIG. 4 shows a block diagram for illustrating a possible exemplary embodiment of the test apparatus according to the present invention.

The schematic diagram of FIG. 4 illustrates an IP-based communication link between a device under test 4 and a communication endpoint 10 which is connected to the test apparatus 1 via a data network 7 and a data interface 6 of the test apparatus 1. As can be seen from FIG. 4, the IP-based communication link between the device under test 4 and the communication endpoint comprises a first communication link $CL_A$ between the device under test 4 and the RF unit 2 of the test apparatus 1 and a second communication link $CL_B$ between the IP unit 3 and the remote communication endpoint 10. In the illustrated embodiment, the communication link $CL_A$ between the device under test 4 and the RF unit 2 is an IP-based wireless communication link which can use in a possible implementation a specific RAN technology. In the illustrated embodiment, the second communication link $CL_B$ between the IP unit 3 and the remote communication endpoint 10 is a wired IP communication link. In a possible embodiment, the test apparatus 1 is adapted to influence the IP-based wireless first communication link $CL_A$ between the device under test 4 and the RF interface of the RF unit 2 of the test apparatus 1 and/or influence the wired communication link between the IP unit 3 and the communication endpoint 10. In a possible embodiment, the IP unit 3 can comprise a server component adapted to initiate and terminate an IP connection IPC between the device under test 4 and a communication endpoint 10 indicated by an IP address included in IP data carried by the RF signal received by the RF interface of the RF unit 2 of the test apparatus 1. In a possible implementation, the IP unit 3 comprises a server component which is configured to simulate a communication endpoint 10 having an IP address.

Figure 5:
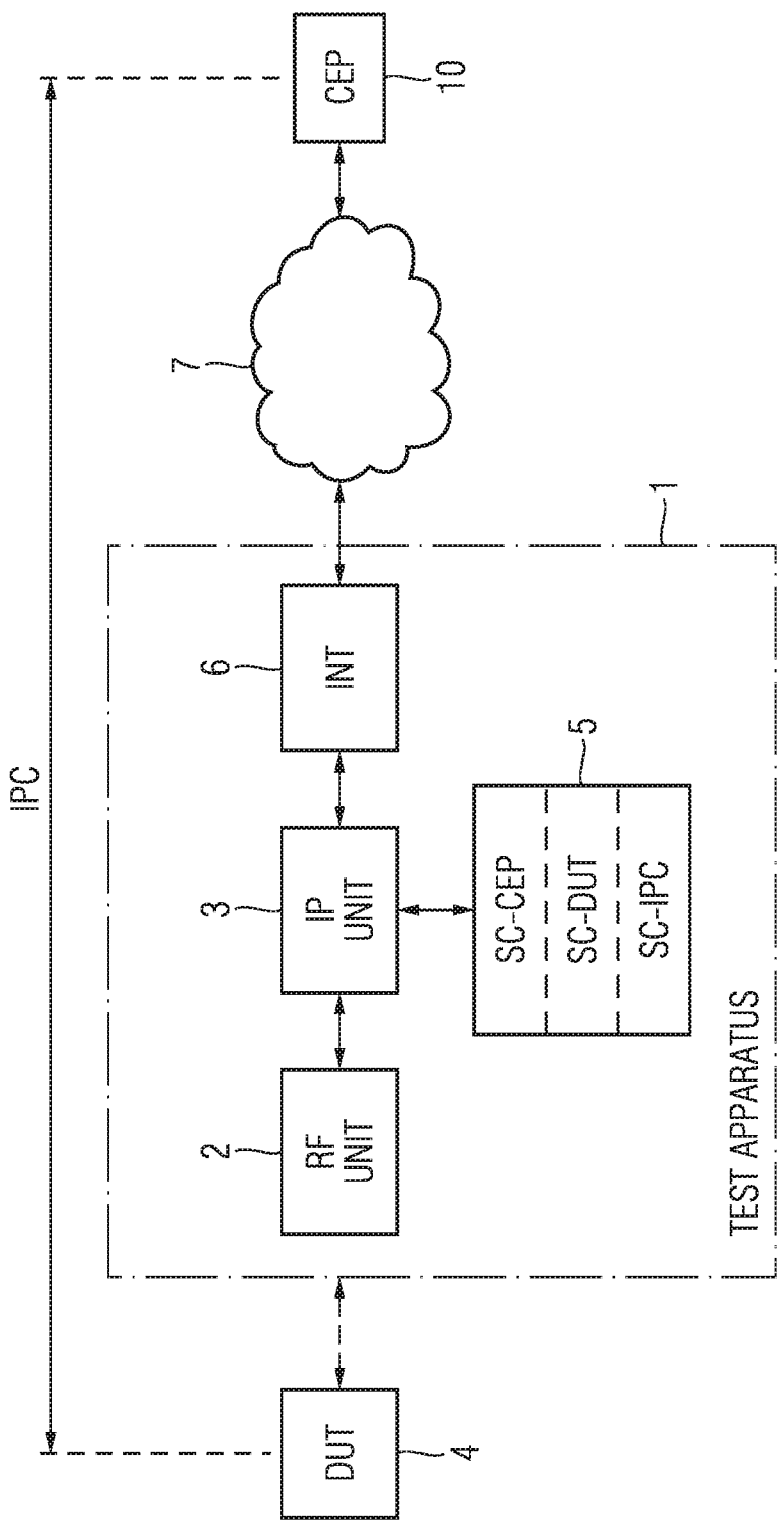
FIG. 5 shows a further block diagram for illustrating a possible exemplary embodiment of a test apparatus according to the present invention.

FIG. 5 shows a further possible exemplary embodiment of a test apparatus 1 according to the first aspect of the present invention. In the illustrated embodiment, the test apparatus 1 comprises a local data memory 5 storing a look-up table LUT. The look-up table LUT comprises in the illustrated embodiment security criteria SC-CEP related to a communication endpoint, security criteria SC-DUT related to the device under test 4 and security criteria SC-IPC related to the IP-based communication link between the device under test 4 and the communication endpoint 10.

Figure 6:
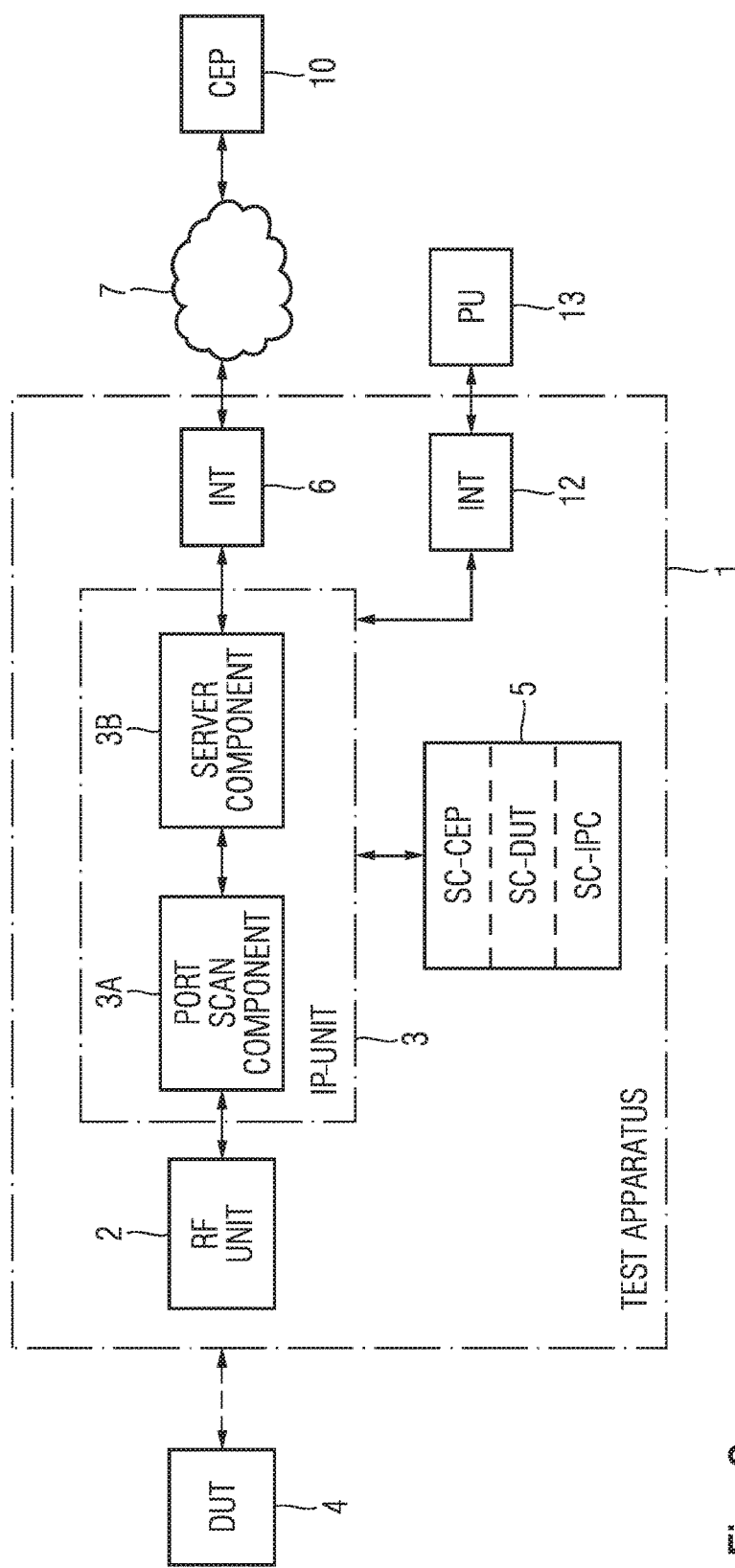
FIG. 6 shows a block diagram for illustrating a further possible exemplary embodiment of a test apparatus according to the present invention.

FIG. 6 shows a further possible embodiment of a test apparatus 1 according to the first aspect of the present invention. In the illustrated embodiment, the IP unit 3 comprises an integrated port scan component 3A and an integrated server component 3B. The port scan component 3A can be configured to scan ports used by the device under test 4 to check a current security status of the device under test 4. The port scan component 3A of the IP unit 3 can be configured to analyse IP data carried by the RF signal received by the RF unit 2 of the test apparatus 1 to identify ports used by the device under test 4 during the active or passive testing procedure performed by the test apparatus 1. In a possible embodiment, the port scan component 3A of the IP unit 3 is adapted to evaluate whether the respective port used by the device under test 4 comprises an open port, a closed port or an invisible port.

Further, in the illustrated embodiment of FIG. 6, the IP unit 3 comprises an integrated server component 3B which is adapted to initiate and/or terminate an IP connection between the device under test 4 and a communication endpoint 10 indicated by an IP address included in the IP data carried by the received RF signal. In the embodiment of FIG. 6, the server component 3B is integrated in the IP unit 3. In an alternative embodiment, the server component 3B can also comprise a standalone server unit. The server component 3B can provide or simulate a connection endpoint, for instance for cryptographic protocols used during the IP-based communication. Accordingly, the server component 3B can be used to test a behaviour of applications executed by the device under test 4 during the testing procedure. The server component 3B can provide modified, i.e. fake, digital certificates in order to analyse and/or compare the connection behaviour of an application executed by the device under test 4. In the illustrated embodiment of FIG. 6, the test apparatus 1 further comprises an output interface 12 adapted to export communication security results related to the communication security of the device under test 4 to an external processing unit 13 for further evaluation. The output interface can be a wireless or wired data interface. The exported communication security results can comprise communication security score values CSSVs calculated by the IP unit 3 for the respective device under test 4.

Figure 7:
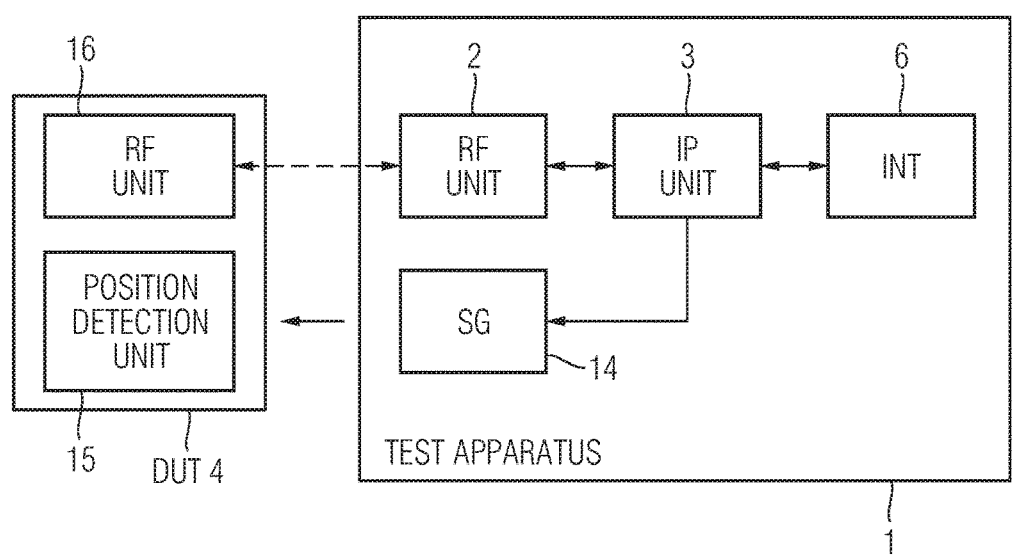
FIG. 7 shows a block diagram for illustrating a further possible exemplary embodiment of a test apparatus according to the present invention.

FIG. 7 illustrates a further possible exemplary embodiment of a test apparatus 1 according to the first aspect of the present invention. In the illustrated embodiment, the test apparatus 1 further comprises a signal generator 14 connected to the IP unit 3. In the illustrated embodiment, the test apparatus 1 is adapted to influence the IP-based communication link between the device under test 4 and a communication endpoint by providing a modified virtual location of the device under test 4. In the illustrated embodiment, the signal generator 14 can for instance provide GPS data detected by a position detection unit 15 of the device under test 4. Depending on the simulated position, an application executed by a processing unit of the device under test 4 may change its communication behaviour which in turn can be observed by the IP unit 3 to assess the communication security of the device under test 4. In the illustrated embodiment of FIG. 7, the device under test 4 comprises an RF unit 16 communicating with the RF unit 2 of the test apparatus 1 via a wireless IP-based communication link.

Figure 8:
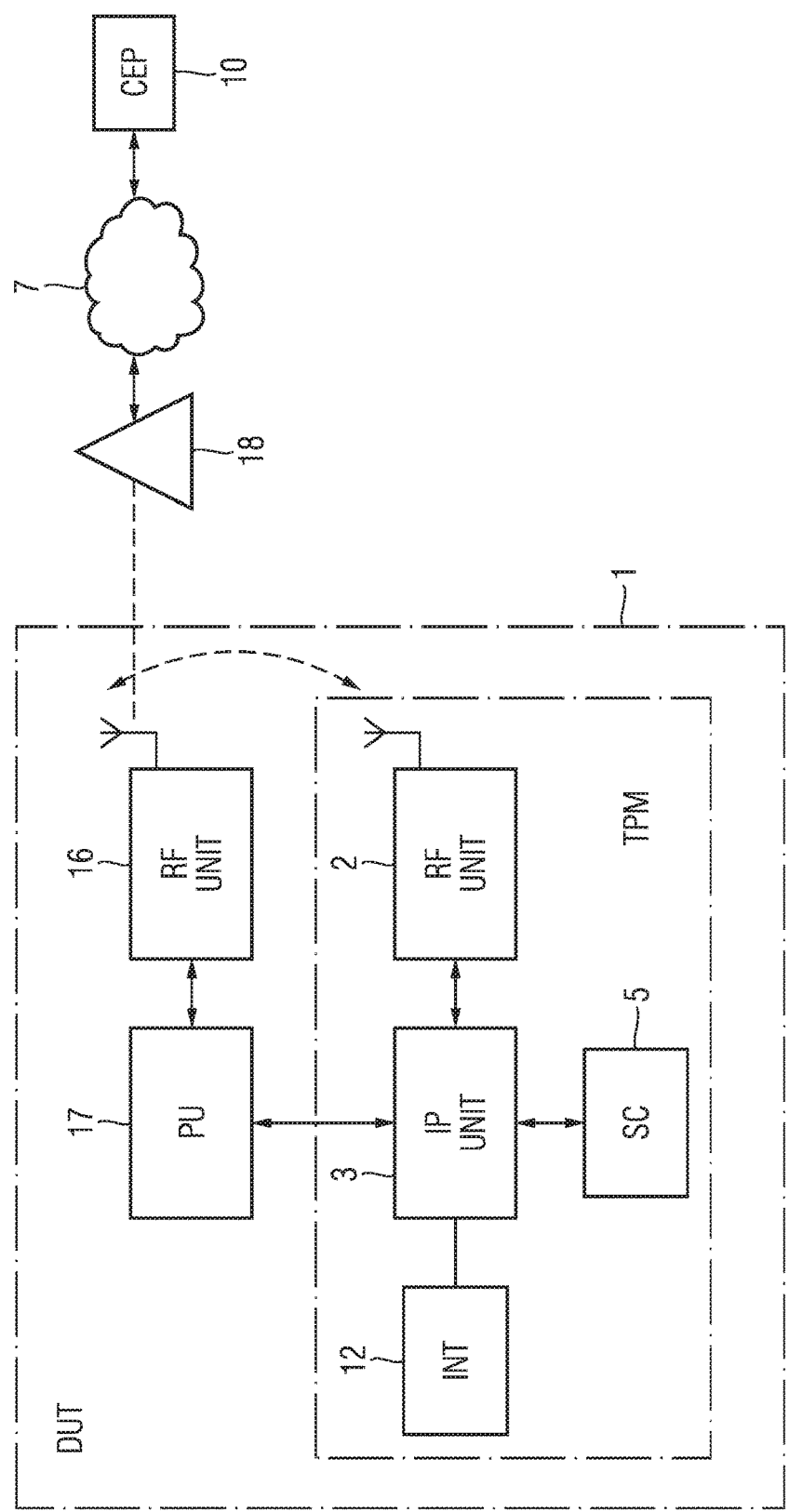
FIG. 8 shows a block diagram for illustrating a possible exemplary embodiment of a test apparatus according to the present invention integrated in a device under test.

FIG. 8 shows a specific embodiment of the test apparatus 1 according to the first aspect of the present invention. In the illustrated embodiment, the test apparatus 1 is integrated as a trusted platform module TPM in the device under test 4. The device under test 4 comprises an internal processing unit 17 comprising one or several microprocessors adapted to execute one or several application programmes. The processing unit 17 of the device under test 4 is connected to an integrated RF unit 16 of the device under test 4 comprising one or several antennas for transmitting and receiving RF signals. In the illustrated schematic diagram of FIG. 8, the RF unit 16 is adapted to exchange RF signals with an access point 18 connected via a data network 7 to a communication endpoint 10. In the embodiment illustrated in FIG. 8, the test apparatus 1 is integrated in the device under test 4. In the illustrated implementation, the test apparatus 1 comprises a trusted platform module TPM. The test apparatus 1 comprises an RF unit 2 having an RF interface adapted to receive via an antenna an RF signal transmitted by an antenna of the RF unit 16 carrying Internet Protocol, IP, data including at least one IP address of the communication endpoint 10. The IP unit 3 of the integrated test apparatus 1 is adapted to analyse the IP data carried in the RF signal received by the RF unit 2 to check and monitor continuously a communication security of the device under test 4 using at least one security criterion related to the communication endpoint 10 addressed by the IP address. The security criteria used by the IP unit 3 of the integrated test apparatus 1 can be stored in a local memory 5 of the trusted platform module TPM. In a possible implementation, the IP unit 3 of the integrated test apparatus 1 can be adapted to execute a test application for testing the security of the communication of the respective device under test 4. The test application executed on the trusted platform module TPM can trigger an application executed by the processing unit 17 of the device under test 4 to establish an IP-based communication link with the communication endpoint 10 and to communicate with the remote communication endpoint via the established IP-based communication link. The integrated test apparatus 1 executing the test application can then either monitor passively the IP-based communication and/or actively influence the IP-based communication to check the communication security of the device under test 4. In the illustrated embodiment of FIG. 8, the integrated test apparatus 1 and the device under test 4 comprise separate RF units 2, 16.

In the further exemplary embodiment of the test apparatus 1 according to the present invention, the test apparatus 1 is also integrated in the device under test 4, wherein the device under test 4 comprises a MIMO RF unit 19 having several antennas for transmitting and receiving RF signals. In the illustrated embodiment, the integrated test apparatus 1 is implemented on a trusted platform module TPM of the device under test 4. The integrated test apparatus 1 can form in a possible implementation a test application which is adapted to control the integrated MIMO RF unit 19 of the device under test 4. In a possible implementation, the test application executed by the trusted platform module TPM controls some of the antennas of the MIMO RF unit 19 to transmit RF signals via an IP-based wireless communication link and other antennas of the MIMO RF unit 19 to receive RF signals from the transmitting antennas. Accordingly, in the illustrated embodiment, the integrated test apparatus 1 is adapted to listen to the RF signals transmitted by the MIMO RF unit 19 of the device under test 4 in a testing procedure. In the illustrated embodiment, the test apparatus 1 integrated in the device under test 4 is adapted to control the MIMO RF unit 19 to operate in a normal operation mode or in a specific test operation mode. During the test operation mode, some of the antennas of the MIMO RF unit 19 are switched to listen to the transmitted RF signals transmitted by other antennas of the MIMO RF unit 19.

Figure 9:
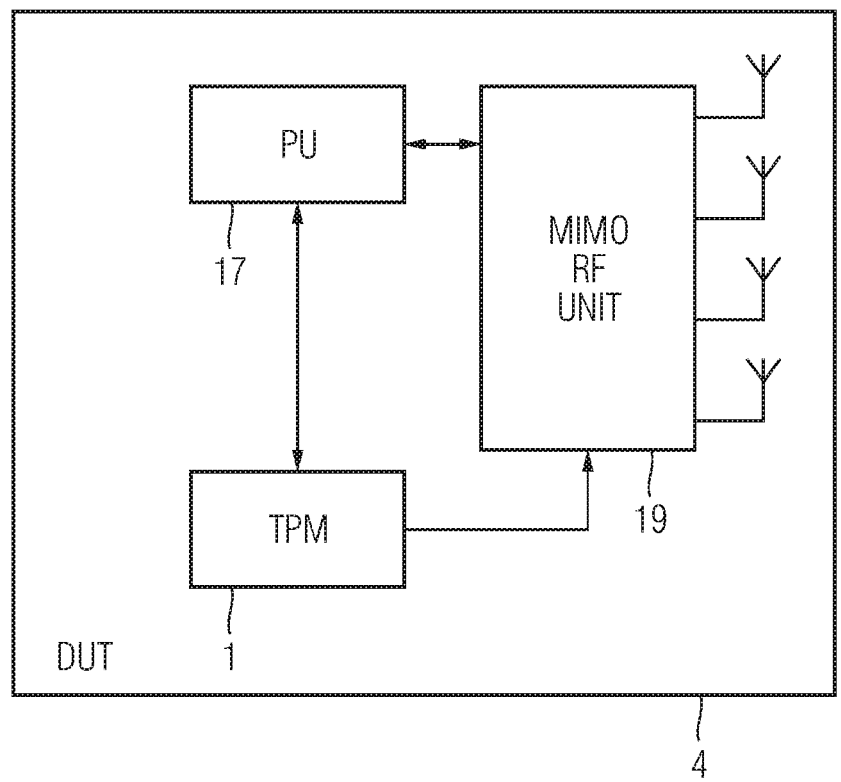
FIG. 9 shows a block diagram of a further possible exemplary embodiment of a test apparatus according to the present invention integrated in a device under test.

When the test apparatus 1 is integrated in the device under test 4 as illustrated in the embodiments of FIGS. 8, 9, monitoring of the communication security of the device under test 4 can be performed continuously in the background and/or during predetermined test periods also during the normal operation of the device under test 4 in the field. If the integrated test apparatus 1 observes a suspicious behaviour of an application running on the processing unit 17 of the device under test 4 and communicating via an IP-based communication link, the test apparatus 1 can perform in a possible implementation fitting countermeasures and/or indicating a warning signal to a user of the device under test 4, for instance via a graphical user interface of the device under test 4. In a possible embodiment, the integrated test apparatus 1 may partially disable an application running on the processing unit 17 showing a suspicious communication behaviour. The integrated test apparatus 1 may also influence actively the IP-based communication link between the device under test 4 and a communication endpoint. The integrated test apparatus 1 can also be switched between different operation modes including a passive testing mode or an active testing mode.

Figure 10:
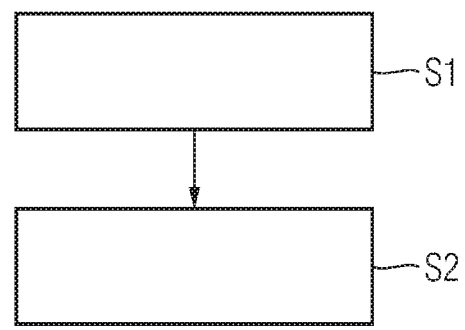
FIG. 10 shows a schematic flow diagram for illustrating a possible exemplary embodiment of a method for testing a device under test according to the present invention.

FIG. 10 shows a flowchart of a possible exemplary embodiment of a method for testing a security of communication of a device under test 4 according to a second aspect of the present invention.

In a first step S1, an RF signal carrying Internet Protocol, IP, data including at least one IP address is received.

In a further step S2, the IP data carried in the received RF signal is analysed to check a communication security of the device under test 4 using at least one security criterion. In a possible implementation, the IP data carried in the received RF signal is extracted to find included IP addresses. In a possible embodiment, the IP data is analysed to check a communication security behaviour of the device under test 4 using at least one security criterion related to a communication endpoint addressed by the IP address and/or using at least one security criterion related to the device under test 4 and/or using at least one security criterion related to the IP connection between the device under test 4 and the communication endpoint addressed by the IP address.

The method and apparatus according to the present invention allow to analyse different security aspects. The method and apparatus allow to test security aspects of expected IP-based communication links to and from a terminal. Examples for that include the analysis of the used protocol and encryption method of the IP-based connection established from and/or to a predetermined application on a terminal. Secondly, the method and apparatus allow to analyse all IP connections to and from a terminal in order to detect malicious applications and/or suspicious behaviour caused by malware, viruses, Trojan horses, backdoors, etc. In a possible embodiment, the test apparatus 1 is placed between the tested device under test 4 and a data network such as the internet. In a possible embodiment, the test apparatus 1 can optionally establish an additional communication link to a third party server for online look-ups on a look-up table LUT stored in a remote database. Further, the test apparatus 1 can optionally export IP connection data to a device external processing unit via an interface. In a possible embodiment, the test apparatus 1 according to the present invention can optionally control a navigation system simulator. In a possible embodiment, the test apparatus 1 can provide communication security results in real time to an external processing unit. The communication results can also be text-based, e.g. CSV, XML or JSON.

LIST OF USED REFERENCE NUMBERS 1 test apparatus
2 RF unit of test apparatus
3 IP unit
4 device under test
5 local memory
6 data interface
7 data network
8 server
9 remote memory
10 communication endpoint
11 DNS server
12 output interface
13 external processing unit
14 signal generator
15 position detection unit
16 RF unit of device under test
17 processing unit
18 access point
19 MIMO RF unit

The invention claimed is:

1. A test apparatus for testing a security of communication of a device under test, DUT, wherein the test apparatus comprises:
an RF unit having an RF interface adapted to receive from the device under test, DUT, an RF signal carrying Internet Protocol, IP, data including at least one IP address; and
an IP unit adapted to analyse IP data carried in the received RF signal to check communication security of the device under test, DUT, using at least one security criterion, SC-CEP, related to a communication endpoint, CEP, addressed by the IP address, wherein the IP unit is adapted to perform a communication security evaluation,
wherein the IP unit evaluates the communication security provided by the device under test, DUT, on the basis of metrics applied to the different security criteria, SC-CEP, related to the communication endpoint, CEP, addressed by the IP address, metrics applied to the different security criteria, SC-DUT, related to the device under test, DUT, and metrics applied to the security criteria, SC IPC, related to the IP connection between the device under test, DUT, and the communication endpoint, CEP, addressed by the IP address to calculate an overall security communication score value, CSSV, of the device under test, DUT, and
wherein if the overall security communication score value, CSSV, is beneath a configurable threshold value: some or all applications of the device under test are partially or completely deactivated, a list of alternative communication endpoints is loaded from a database connected to the test apparatus, and the CSSV is exported to an external processing unit.

2. The test apparatus according to claim 1,
wherein said IP unit is adapted to analyse IP data carried by the received RF signal to check the communication security of the device under test, DUT, on the basis of at least one security criterion, SC, related to the communication endpoint, CEP, addressed by the IP address,
wherein the at least one security criterion, SC-CEP, related to the communication endpoint, CEP, comprises:
a reputation of the addressed communication endpoint,
a usage age of the IP address,
a geographical location of the addressed communication endpoint,
an owner of the addressed communication endpoint,
a type of the addressed communication endpoint,
an observed communication behaviour of the addressed communication endpoint, and/or
a certificate of the addressed communication endpoint issued by a trusted certificate authority.

3. The test apparatus according to claim 2,
wherein the security criterion, SC-CEP, related to the communication endpoint, CEP, addressed by the IP address is read by said IP unit from a communication endpoint look-up table, LUT, stored in a memory,
wherein the memory is a local memory integrated in said test apparatus or a remote memory of a server of a data network to which the test apparatus is connected by means of a network interface of said test apparatus.

4. The test apparatus according to claim 1,
wherein the IP address comprises a numerical IP address or a domain name translated by a DNS server of a data network into a numerical IP address.

5. The test apparatus according to claim 1,
wherein the IP unit is adapted to check the communication security of the device under test, DUT, on the basis of
security criteria, SC-CEP, related to the communication endpoint, CEP, addressed by the IP address,
security criteria, SC-DUT, related to the device under test, DUT, and/or
security criteria, SC-IPC, related to the IP connection, IPC, between the device under test, DUT, and the communication endpoint, CEP, addressed by the IP address.

6. The test apparatus according to claim 5,
wherein the security criteria, SC-DUT, related to the device under test, DUT, comprise protocols supported by the device under test, DUT, and available cipher suites,
wherein the security criteria, SC-IPC, related to the IP connection, IPC, between the device under test, DUT, and the communication endpoint, CEP, addressed by the IP address comprises:
security criteria extracted from headers of data packets transported via the IP connection including a negotiated protocol type, a negotiated protocol version, a negotiated key exchange mechanism and negotiated user cipher suites and/or
security criteria extracted from data content of data packets, DP, transported via said IP connection including user names, passwords, a current position of the device under test, DUT, an IMEI and/or an IMSI.

7. The test apparatus according to claim 1,
wherein the test apparatus is further adapted to influence an IP-based communication link, IPC, between the device under test, DUT, and a communication endpoint, CEP, to analyse an impact on the operation behaviour of said device under test, DUT, for checking the communication security of the respective device under test, DUT.

8. The test apparatus according to claim 7,
wherein the test apparatus is adapted to influence the IP-based communication link, IPC, between the device under test, DUT, and the communication endpoint, CEP, by modifying a data throughput of a wireless IP-based communication link between the device under test, DUT, and the RF communication interface of the RF unit of said test apparatus and/or by modifying a data throughput of a wired IP communication link between the IP unit of said test apparatus and the communication endpoint, CEP.

9. The test apparatus according to claim 7,
wherein the test apparatus is adapted to influence the IP based communication link between the device under test, DUT, and the communication endpoint, CEP, by changing a Radio Access Network, RAN, technology of a wireless IP-based communication link between the device under test, DUT, and the RF interface of the RF unit of said test apparatus.

10. The test apparatus according to claim 7,
wherein the test apparatus is adapted to influence the IP-based communication link, IPC, between the device under test, DUT, and the communication endpoint, CEP, by modifying an address type of an IP address of said device under test, DUT, and/or an address type of the IP address used for addressing said connection endpoint, CEP, and/or by modifying an IP connection type of an IP communication link between the IP unit of said test apparatus and the communication endpoint, CEP.

11. The test apparatus according to claim 7,
wherein the test apparatus is adapted to influence the IP-based communication link, IPC, between the device under test, DUT, and the communication endpoint, CEP, by providing a modified virtual location of said device under test, DUT, detected by a position detection unit of said device under test, DUT, and/or by providing a modified virtual network operator to said device under test, DUT.

12. The test apparatus according to claim 1,
wherein the IP unit is adapted to analyse the IP data carried by the received RF signal to check a connection behaviour of an application, APP, installed on the device under test, DUT.

13. The test apparatus according claim 1,
wherein the test apparatus comprises an output interface to export communication security results related to the communication security of said device under test, DUT, to an external processing unit.

14. The test apparatus according to claim 1,
wherein the device under test, DUT, comprises a mobile device or a fixed terminal.

15. The test apparatus according to claim 1,
wherein the test apparatus is a device connected via a wireless communication link to the device under test, DUT, or is a device plugged into the device under test, DUT, or is integrated in said device under test, DUT.

16. The test apparatus according to claim 15,
wherein the test apparatus integrated in said device under test, DUT, is implemented on a trusted platform module, TPM.

17. The test apparatus according to claim 16,
wherein the RF unit of said device under test, DUT, comprises a MIMO RF unit having several antennas, wherein said MIMO RF unit is controlled by the test apparatus integrated in said device under test, DUT.

18. The test apparatus according to claim 15,
wherein the test apparatus integrated in said device under test, DUT, is adapted to execute a test application, TEST-APP, for testing a security of a communication of the respective device under test, DUT.

19. The test apparatus according to claim 1,
wherein the RF unit of said test apparatus is adapted to communicate with an RF unit of said device under test, DUT, via a wireless IP-based communication link.

20. A method for testing a security of communication of a device under test, DUT, comprising the steps of:
receiving from the device under test, DUT, an RF signal carrying Internet Protocol, IP, data including at least one IP address; and
analysing, by an IP unit, the IP data carried by the received RF signal to check a communication security of the device under test, DUT, using at least one security criterion, SC-CEP, related to a communication endpoint, CEP, addressed by the IP address and/or using at least one security criterion, SC-DUT, related to the device under test, DUT, and/or using at least one security criterion, SC-IPC, related to the IP connection, IPC, between the device under test, DUT, and the communication endpoint, CEP, addressed by the IP address,
wherein analysing the IP data comprises performing a communication security evaluation, comprising evaluating the communication security provided by the device under test, DUT, on the basis of metrics applied to the different security criteria, SC CEP, related to the communication endpoint, CEP, addressed by the IP address, metrics applied to the different security criteria, SC-DUT, related to the device under test, DUT, and metrics applied to the security criteria, SC IPC, related to the IP connection between the device under test, DUT, and the communication endpoint, CEP, addressed by the IP address to calculate an overall security communication score value, CSSV, of the device under test, DUT, and
wherein if the communication endpoint leads to a calculated communication security score value CSSV beneath a configurable threshold value, the method further comprises partially or completely deactivating some or all applications of the device under test, loading a list of alternative communication endpoints from a database connected to the test apparatus, and exporting the CSSV to an external processing unit.

21. The method according to claim 20,
wherein an IP-based communication link, IPC, between the device under test, DUT, and the communication endpoint, CEP, is influenced during the testing to analyse an impact on the operation behaviour of said device under test, DUT.

* * * * *